US012281777B1

(12) United States Patent
Dai et al.

(10) Patent No.: US 12,281,777 B1
(45) Date of Patent: Apr. 22, 2025

(54) SPOTLIGHT UNIT WITH ADJUSTABLE LENS MODULE

(71) Applicant: Dalite New Energy (Shanghai) Co., Ltd., Shanghai (CN)

(72) Inventors: Xiaosu Dai, Jian (CN); Haijin Zhu, Changzhou (CN)

( * ) Notice: Subject to any disclaimer, the term of this patent is extended or adjusted under 35 U.S.C. 154(b) by 0 days.

(21) Appl. No.: 18/596,544

(22) Filed: Mar. 5, 2024

(51) Int. Cl.
*F21V 14/06* (2006.01)
*F21S 8/00* (2006.01)
*F21V 5/04* (2006.01)
*F21V 14/02* (2006.01)
*F21V 23/00* (2015.01)
*F21Y 105/18* (2016.01)
*F21Y 115/10* (2016.01)

(52) U.S. Cl.
CPC .............. *F21V 14/06* (2013.01); *F21S 8/003* (2013.01); *F21V 5/046* (2013.01); *F21V 14/02* (2013.01); *F21V 23/005* (2013.01); *F21Y 2105/18* (2016.08); *F21Y 2115/10* (2016.08)

(58) Field of Classification Search
CPC .......... F21V 14/02; F21V 14/06; F21V 5/046; F21S 8/003
See application file for complete search history.

(56) References Cited

U.S. PATENT DOCUMENTS 11,421,837 B2 * 8/2022 Zhang ........................ B08B 3/02
2010/0097803 A1 * 4/2010 Wu .......................... F21V 5/007 362/244
2019/0093859 A1 * 3/2019 Peard ................... G02B 6/0008
2019/0376663 A1 * 12/2019 Gladden ................. F21V 5/008
2024/0255131 A1 * 8/2024 Yu ........................... F21V 17/12

* cited by examiner

*Primary Examiner* — Tracie Y Green
*Assistant Examiner* — Michael Chiang
(74) *Attorney, Agent, or Firm* — Tsz Lung Yeung

(57) ABSTRACT

A spotlight unit includes a main housing having a receiving cavity, an illuminating module mounted in the receiving cavity and an adjustable lens module. The illuminating module includes a plurality of illuminating units for generating illumination. The adjustable lens module is also mounted in the receiving cavity of the main housing at a position corresponding to the illuminating module. The adjustable lens module includes at least one lens element which is in optical communication with the illuminating units. At least one of the illuminating module and the adjustable lens module is arranged to adjustably move with respect to the main housing so as to alter a distance between the illuminating module and the adjustable lens module for adjusting a focal length of the lens element with respect to the illuminating units to achieve at least two projection effects.

6 Claims, 6 Drawing Sheets

SPOTLIGHT UNIT WITH ADJUSTABLE LENS MODULE

BACKGROUND OF THE PRESENT INVENTION

Field of Invention

The present invention relates to spotlights, and more particularly to a spotlight unit which is capable of producing illumination having an adjustable focal length.

Description of Related Arts

Spotlights have widely been used all over the world to provide focused and projected spot of light for illuminating a person, object, or group on a designated area, such as a stage. Very often, spotlights are installed at elevated altitude to provide illumination from above the objects or persons. Very often, traditional spotlights may be utilized to project illumination from any angle, and may be used for providing illumination in mines, buildings, stadiums, bridges, monuments, etc.

Light beams from conventional spotlights may have a wide range of projection angles, usually between 00 to 180°. These angles may serve different functions. For example, a narrow projection beam may be utilized to provide highly focused illumination to a designated search, such as for searching objects or persons.

A major disadvantage of conventional spotlights such as the one described above is that the outer housing of the spotlight may be movably supported by a supporting frame. Thus, the outer housing may be tilted with respect to the supporting frame. By tilting the outer housing, the angle of light beam may be adjusted. However, when the angle of the light beam is adjusted and fixed, there is no way to adjust the focal length of the light.

As a result, there is a need to develop a spotlight with adjustable focal length so as to facilitate a wide range of operation by a single spotlight unit.

SUMMARY OF THE PRESENT INVENTION

Certain variations of the present invention provide a spotlight unit which is capable of producing illumination having an adjustable focal length.

Certain variations of the present invention provide a spotlight unit comprising an illuminating module and an adjustable lens module, wherein a distance between the illuminating module and the adjustable lens module can be conveniently adjusted so as to produce illumination having adjustable focal length.

In one aspect of the present invention, it provides a spotlight unit, comprising:

a main housing having a receiving cavity;

an illuminating module mounted in the receiving cavity, the illuminating module comprising a plurality of illuminating units for generating illumination; and an adjustable lens module mounted in the receiving cavity of the main housing at a position corresponding to the illuminating module, the adjustable lens module comprising at least one lens element which is in optical communication with the illuminating units, at least one of the illuminating module and the adjustable lens module being arranged to adjustably move with respect to the main housing so as to alter a distance between the illuminating module and the adjustable lens module for adjusting a focal length of the lens element with respect to the illuminating units to achieve at least two projection effects.

This summary presented above is provided merely to introduce certain concepts and not to identify any key or essential features of the claimed subject matter.

DETAILED DESCRIPTIONS OF THE PRESENT INVENTION

Figure 1:
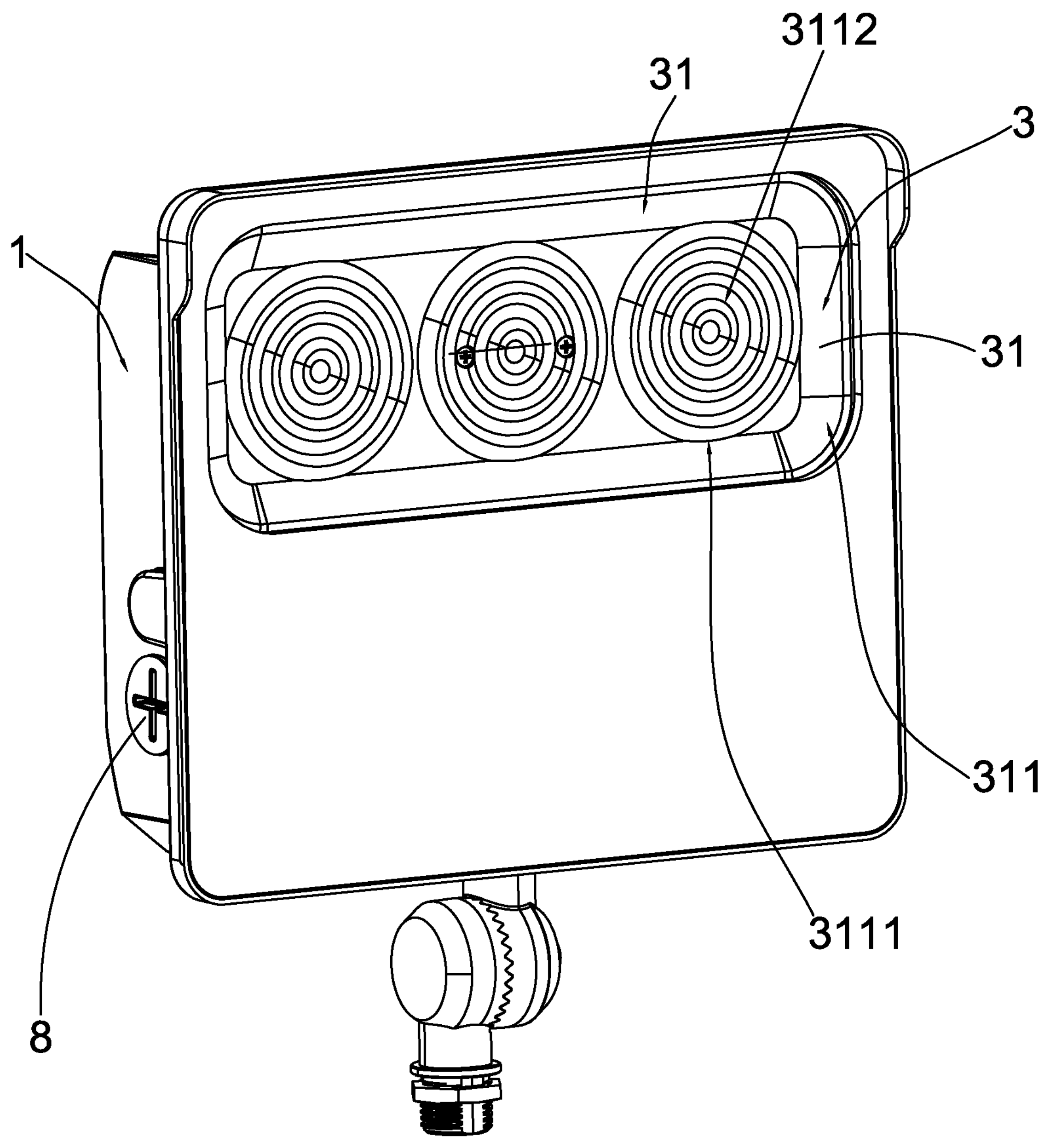
FIG. 1 is a perspective view of a spotlight unit according to a preferred embodiment of the present invention.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Referring to FIG. 1 to FIG. 7 of the drawings, a spotlight unit according to a preferred embodiment of the present invention is illustrated. Broadly, the spotlight unit may comprise a main housing 1 having a receiving cavity 12, an illuminating module 2, and an adjustable lens module 3.

The illuminating module 2 may be mounted in the receiving cavity 12. Moreover, the illuminating module 2 may comprise a plurality of illuminating units 21 for generating illumination.

The adjustable lens module 3 may be mounted in the receiving cavity 12 of the main housing 1 at a position corresponding to the illuminating module 2. The adjustable lens module 3 may comprise a plurality of (but at least one) lens elements 311 which is in optical communication with the illuminating units 21. At least one of the illuminating module 2 and the adjustable lens module 3 may be arranged to adjustably move with respect to the main housing 1 so as to alter a distance between the illuminating module 2 and the adjustable lens module 3 for adjusting a focal length of the lens elements 311 with respect to the illuminating units 21 to achieve at least two projection effects.

Figure 2:
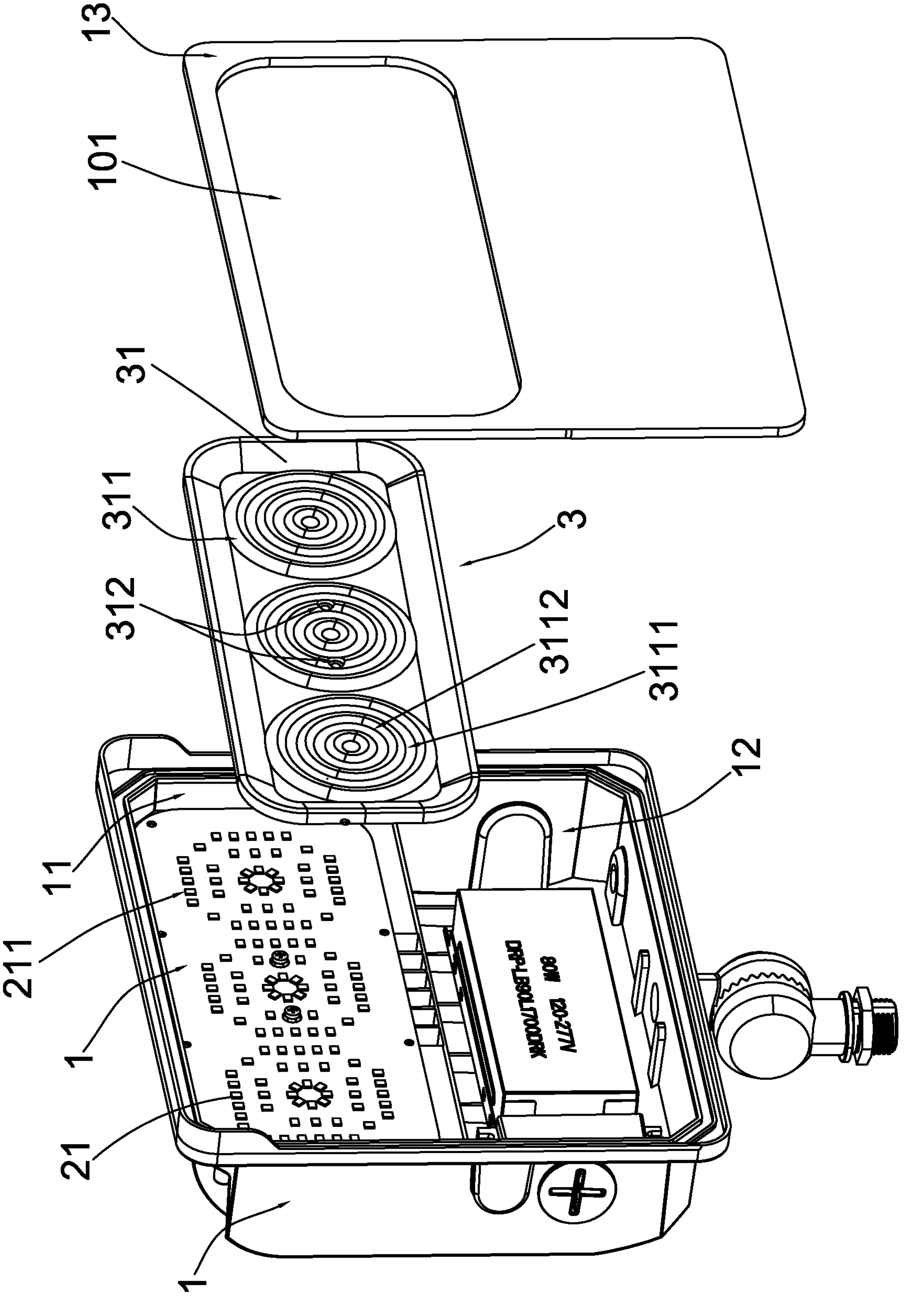
FIG. 2 is an exploded perspective view of the spotlight unit according to the preferred embodiment of the present invention.

According to the preferred embodiment of the present invention, the main housing 1 may have a light projection window 101 communicating with the adjustable lens module 3 for allowing light beams to travel out of the main housing 1 through the light projection window 101. The light projection window 101 may be configured as a through opening, as shown in FIG. 2 of the drawings. The illuminating module 2 and the adjustable lens module 3 may be received in the receiving cavity 12 of the main housing 1.

The illuminating module 2 may comprise a main control board 22, and a plurality of illuminating units 21 mounted on the main control board 22. A control circuitry may be implemented on the main control board 22 for controlling an operation of the illuminating units 21. Accordingly, the control circuitry may contain a plurality of electrical components for activating and controlling the operation of the illuminating units 21.

Each of the illuminating units 21 may be configured as a LED and may be arranged to generate high-intensity light beam at a predetermined direction. As shown in FIG. 2 of the drawings, the illuminating units 21 may be arranged in an array on the main control board 22 for generating light beams of predetermined patterns. It is worth mentioning that the arrangement of the illuminating units 21 on the main control board 22 may be varied according to the circumstances in which the present invention is manufactured. In this preferred embodiment of the present invention, the illuminating units 21 may be grouped into three illuminating zone 211 which correspond to the three lens elements 31 on the adjustable lens module 3 respectively.

The adjustable lens module 3 may comprise a peripheral frame 31 and a plurality of lens elements 311 supported by the peripheral frame 31, wherein each of the lens elements 311 may have a predetermined outer contour to provide optical alteration to the light beams generated from the illuminating units 21. According to the preferred embodiment of the present invention, each of the lens elements 31 may be configured from transparent material such as glass which allows light to pass through.

It is worth mentioning that each of the lens elements 311 of the lens module 3 may have a predetermined external contour so as to create a predetermined optical property. For example, each of the lens elements 311 may have an optimally convex and concave contour so as to modify the focal length of the lens elements 311 with respect to the corresponding illuminating units 21 when the illuminating module 2 moves toward or away from the lens module 3. According to the preferred embodiment of the present invention, each of the lens elements 311 may have a plurality of annular convex portions 3111 and a plurality of annular concave portions 3112 concentrically and alternately arranged with respect to each other so as to form a wavy cross-sectional shape when viewed from the side. Note that the number of the annular convex portions 3111 and the annular concave portions 3112 may be varied according to manufacturing circumstances.

This configuration ensures even distribution of light on the lens elements 311 so that when the lens module 3 is moved with respect to the illuminating module 2, the distribution of light originated from the illuminating module 2 toward the lens module 3 will remain unchanged. In other words, the angle of distribution of light along a vertical axis and a horizontal axis of the corresponding lens element 311 will change correspondingly when the illuminating module 2 is moved with respect to the lens module 3. However, the distribution of light on the lens elements 311 will remain even. Only the focal length of the lens elements 311 may be altered.

As shown in FIG. 2 of the drawings, in this preferred embodiment of the present invention, the lens module 3 may have three lens elements 311 provided on the peripheral frame 31. Accordingly, the illuminating units 21 may be arranged on the main control board 22 to form three distinct sources of light by the three illuminating zones 211 for providing light beams toward the lens elements 311 respectively. It is worth mentioning that the number of lens elements 311 and the arrangement of the illuminating units 21 on the main control board 22 may be altered depending on the circumstances in which the present invention is manufactured or operated.

Figure 3:
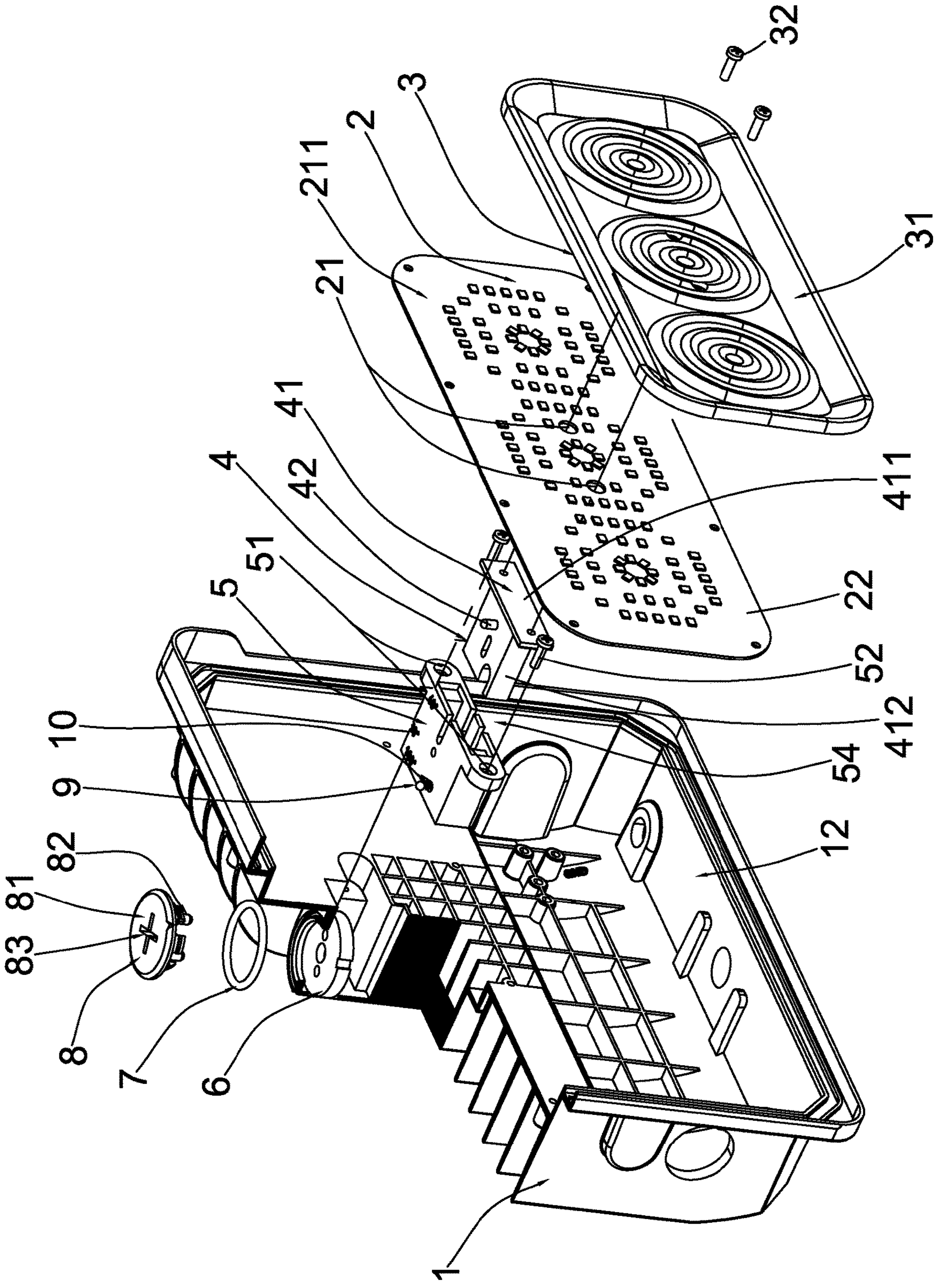
FIG. 3 is another exploded perspective view of the spotlight unit according to the preferred embodiment of the present invention.
Figure 4:
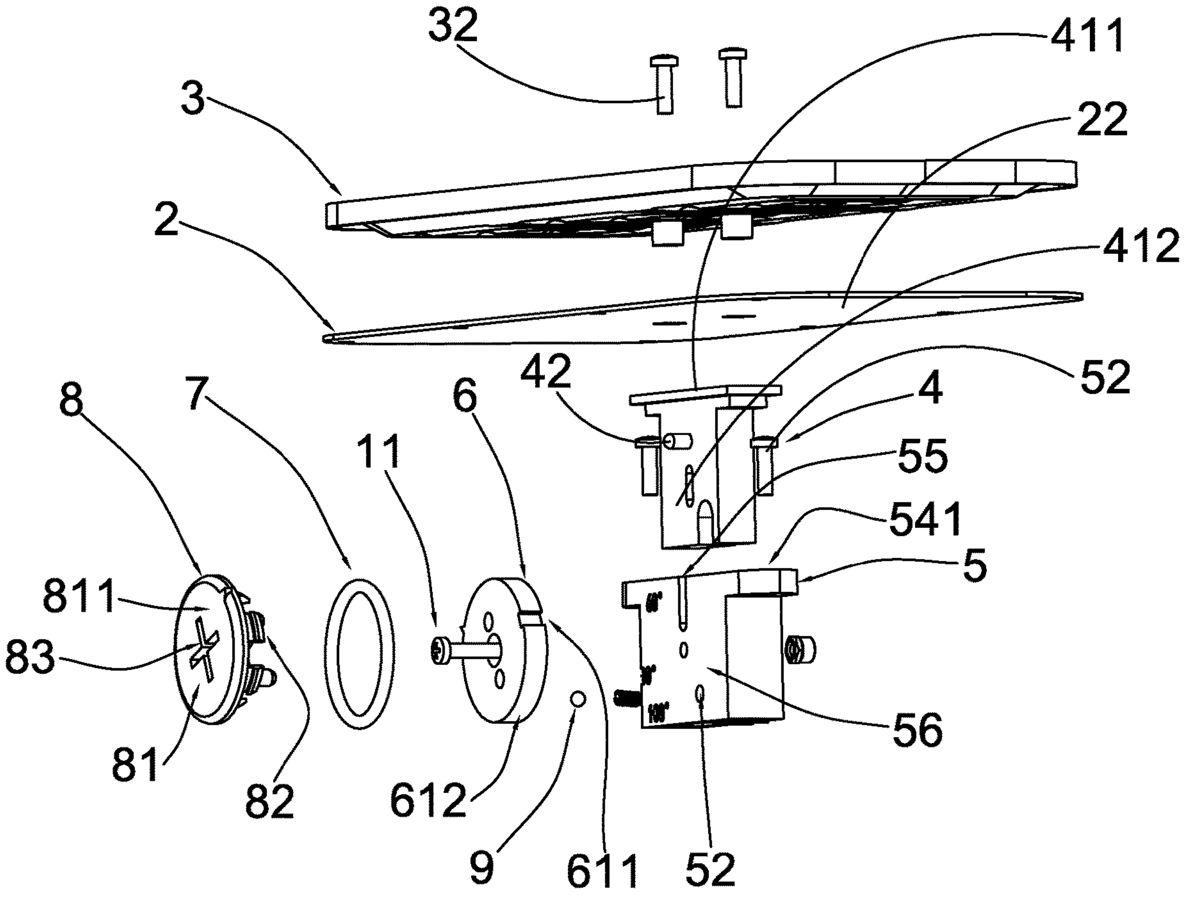
FIG. 4 is a schematic diagram of the spotlight unit according to the preferred embodiment of the present invention.

Referring to FIG. 3 to FIG. 4 of the drawings, the spotlight unit may further comprise an actuation mechanism 4 provided in the receiving cavity 12 of the main housing 1 and operatively coupled to the illuminating module 2 for selectively driving the illuminating module 3 to move in the receiving cavity 12. More specifically, the actuation mechanism 4 may comprise a movable driving platform 41 and a supporting base 5 securely mounted on the main housing 1 in the receiving cavity 12 through a plurality of mounting holes 51 and mounting screws 52, wherein the movable driving platform 41 may be coupled to the supporting base 5 in an adjustably movable manner.

The movable driving platform 41 may comprise a connecting panel 411 and an insertion base 412 extending from the connecting panel 411. The connecting panel 411 may be connected to a rear side 24 of the main control board 22 through a plurality of screws 32. The insertion base 412 may rearwardly extend from the connecting panel 411 to operatively couple to the supporting base 5. The movable driving platform 41 may further have a guiding pin 42 outwardly extending from the insertion base 412.

On the other hand, the supporting base 5 may be configured to have a tubular structure and therefore have an accommodating cavity 54 arranged to accommodate the insertion base 412 of the movable driving platform 41. The supporting base 5 may further have a guiding slot 55 formed on a sidewall 56 thereof at a position corresponding to that of the guiding pin 42. The guiding slot 55 may extend from a front opening 541 of the accommodating cavity 54 and extend along the sidewall 56.

Thus, the insertion base 412 may be arranged to be movably received in the accommodating cavity 54, in such a manner that the guiding pin 42 may slide along the guiding slot 55. Accordingly, the guiding pin 42 may be shaped and sized to correspond to the guiding slot 55. As shown in FIG. 4 of the drawings, the insertion base 412 may be accommodated in the accommodating cavity 54 in a movable manner along a depth thereof.

Figure 5:
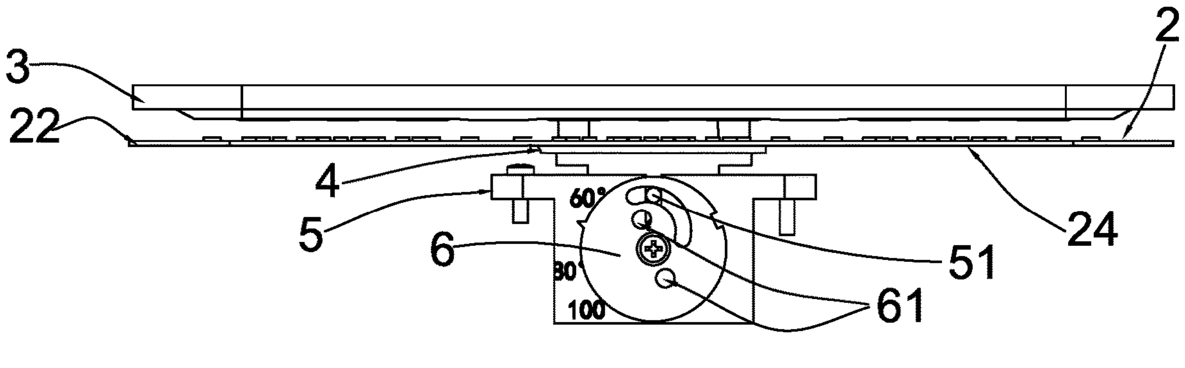
FIG. 5 is a side view of the spotlight unit according to the preferred embodiment of the present invention.
Figure 6:
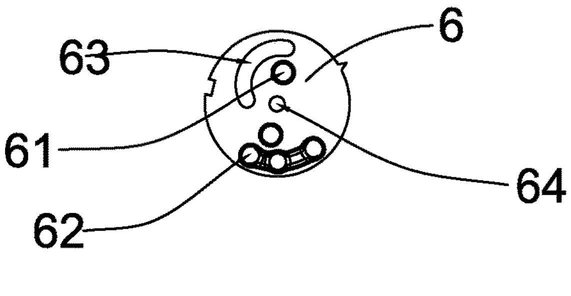
FIG. 6 is a schematic diagram of a driven rotor of the spotlight unit according to the preferred embodiment of the present invention.

The actuation mechanism 4 may further comprise a driven rotor 6 and an actuation member 8 coupled to the driven rotor 6. The driven rotor 6 may be rotatably mounted on the supporting base 5 and the insertion base 412 and may be driven to rotate by the actuation member 8. Referring to FIG. 3 to FIG. 5 of the drawings, the driven rotor 6 may have a substantially circular cross-sectional shape and may have a driving slot 611 indently formed on a circumferential edge 612 of the driven rotor 6. Moreover, the driven rotor 6 may further have a curved slot 63 formed on a base surface 614 thereof.

The curved slot 63 may have a curved contour resembling a segment of a full circle (i.e. a circular path). When the insertion base 412 is accommodated in the supporting base 5, the guiding pin 42 may be allowed to extend through the driving slot 611 and the curved slot 63, so that a rotational movement on the part of the driving rotor 6 may impart a linear movement (such as a vertical linear movement) on the part of the insertion base 412 as dictated and guided by the guiding slot 55.

On the other hand, the actuation member 8 may be shaped and sized to correspond to the driven rotor 6, and may have a driving portion 81 and a plurality of coupling legs 82 rearwardly extend from the driving portion 81 to connect to the driven rotor 6. Accordingly, the driven rotor 6 may have a plurality of connecting slots 61 formed on the base surface 614, wherein the coupling legs 82 may be inserted into the connecting slots 61 respectively so as to connect the actuation member 8 to the driven rotor 6. Furthermore, the actuation member 8 may have a driving indention 83 formed on an outer side surface 811 of the driving portion 81 for allowing a user to turn the actuation member 8 by using a hand tool, such as a screwdriver, to insert in the driving indention 83.

The actuation mechanism 4 may further comprise an O-ring 7 provided between the actuation member 8 and the driven rotor 6 for providing cushion between the actuation member 8 and the driven rotor 6. The driven rotor 6 and the supporting base 5 may be connected by a main screw 11 through a hole 64. The main screw 11 may form an axis for rotation of the driven rotor 6.

Furthermore, the driven rotor 6 may further have a sliding slot 62 formed thereon, while the supporting base 5 may further have at least one securing hole 52. The actuation mechanism 4 may further comprise a roller 9 and a resilient element 10 mounted in the sliding slot 62 of the driven rotor 6 and secured by the securing hole 52. The resilient element 10 may exert a biasing force against the roller 9 toward the supporting base 5, so that when the driven rotor 6 is driven to rotate, the roller 9 may move with the driven rotor 6 until the roller 9 engages with the securing hole 52. The roller 9 and the resilient element 10 may provide a mechanical signal that the driven rotor 6 is rotated to a specific position with respect to the supporting base 5.

The operation of the present invention may be described as follows: the distance between the lens module 3 and the illuminating module 2 may be conveniently and accurately adjusted by using the actuation mechanism 8. As described above, a user may be able to use a hand tool, such as a screwdriver, to turn (i.e. rotate) the driving portion 81 of the actuation member 8. By turning the driving portion 81, the driven rotor 6 may also be driven to rotate.

When the driven rotor 6 is driven to rotate, the guiding pin 42 may be driven to move along a longitudinal direction of the guiding slot 55 formed on the sidewall 56 of the supporting base 5. This may in turn drive the movable driving platform 41 to move along the same direction, which is along a depth of the main housing 1. When the movable driving platform 41 moves along the depth of the main housing 1, the illuminating module 2 may also be driven to move along the corresponding direction so as to alter a distance between the illuminating module 2 and the lens module 3. When this happens, the focal length of the light beams from the illuminating units 21 may be varied.

Figure 7:
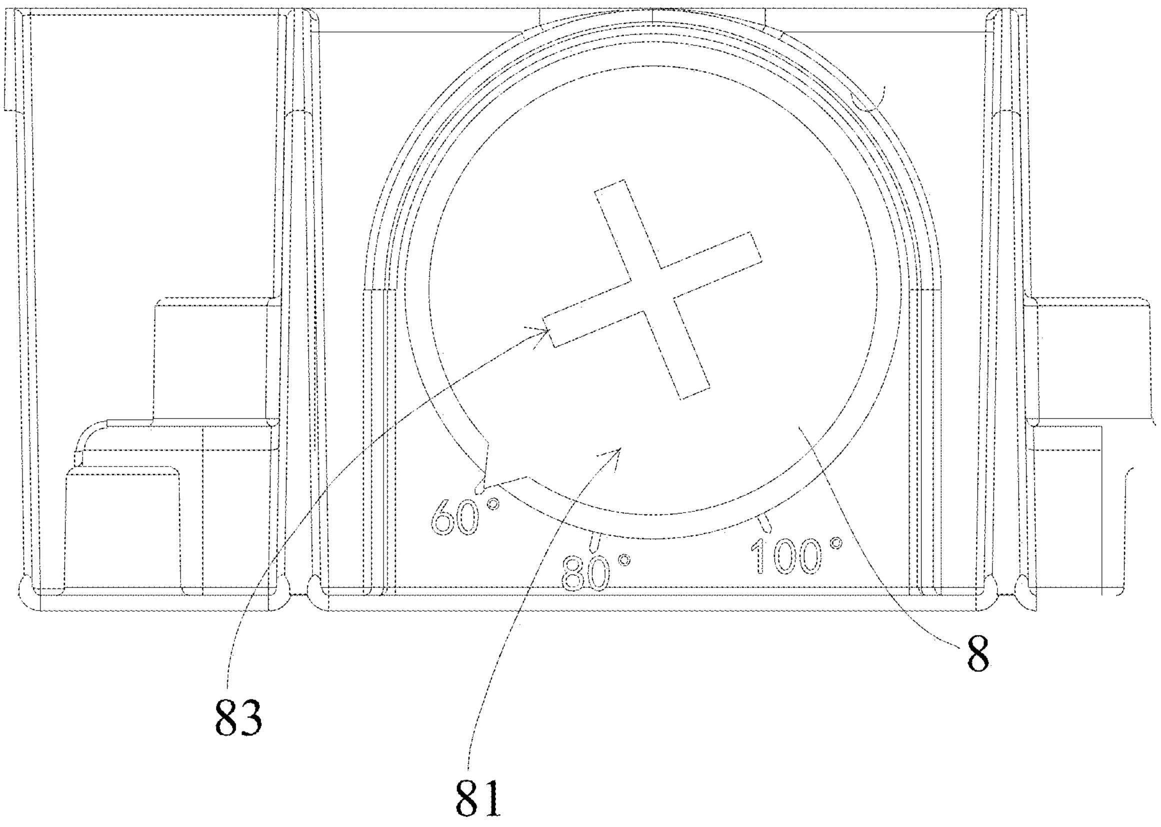
FIG. 7 is a schematic view of an actuation member of the spotlight unit according to the preferred embodiment of the present invention.

As shown in FIG. 7 of the drawings, markings may be formed on the supporting base 5 for allowing a user to adjust and select the most appropriate focal length of the illuminating module 2. The different preset focal length of the illuminating module 2 may correspond to different positions of the driven rotor 6 with respect to the supporting base 5. The roller 9 described above may signal, by mechanical sound when engaging with the corresponding securing hole 52, that the driven rotor 6 has been turned to a predetermined position, which corresponds to a predetermined focal length of the illuminating module 2. As shown in FIG. 1 of the drawings, the actuation member 8 may expose out of the main housing 1 so as to allow convenient adjustment by a user of the present invention.

It is worth mentioning that in altering the distance between the illuminating module 2 and the lens module 3, either the illuminating module 2 or the lens module 3 or both the illuminating module 2 and the lens module 3 may be driven to move to accomplish this purpose. These are alternatives covered by the spirit of the present invention.

The present invention, while illustrated and described in terms of a preferred embodiment and several alternatives, is not limited to the particular description contained in this specification. Additional alternative or equivalent components could also be used to practice the present invention.

What is claimed is:

1. A spotlight unit, comprising:

a main housing having a receiving cavity;

an illuminating module mounted in the receiving cavity, the illuminating module comprising a main control board and a plurality of illuminating units for generating illumination;

an adjustable lens module mounted in the receiving cavity of the main housing at a position corresponding to the illuminating module, the adjustable lens module comprising at least one lens element which is in optical communication with the illuminating units, at least one of the illuminating module and the adjustable lens module being arranged to adjustably move with respect to the main housing so as to alter a distance between the illuminating module and the adjustable lens module for adjusting a focal length of the lens element with respect to the illuminating units to achieve at least two projection effects; and an actuation mechanism provided in the receiving cavity of the main housing and operatively coupled to the illuminating module for selectively driving the illuminating module to move in the receiving cavity, the actuation mechanism comprising a movable driving platform and a supporting base securely mounted in the receiving cavity of the main housing, wherein the movable driving platform is coupled to the supporting base in an adjustably movable manner, the movable driving platform comprising a connecting panel and an insertion base extending from the connecting panel, the connecting panel being connected to a rear side of the main control board, the insertion base rearwardly extending from the connecting panel to movably couple to the supporting base, wherein the movable driving platform further has a guiding pin outwardly extending from the insertion base, the supporting base having an accommodating cavity arranged to movably accommodate the insertion base of the movable driving platform along a depth of the supporting base, the supporting base further having a guiding slot formed on a sidewall thereof at a position corresponding to that of the guiding pin, the guiding slot extending from a front opening of the accommodating cavity and extending along the sidewall, the guiding pin being arranged to slide along the guiding slot.

2. The spotlight unit, as recited in claim 1, wherein the actuation mechanism further comprises a driven rotor and an actuation member coupled to the driven rotor, the driven rotor being rotatably mounted on the supporting base and the insertion base and adapted to be driven to rotate by the actuation member, the driven rotor having a driving slot indently formed on a circumferential edge thereof, and a curved slot formed on a base surface thereof, wherein when the insertion base is accommodated in the supporting base, the guiding pin is allowed to extend through the driving slot and the curved slot, so that a rotational movement of the driving rotor is arranged to impart a linear movement on the insertion base as dictated and guided by the guiding slot.

3. The spotlight unit, as recited in claim 2, wherein the actuation member has a driving portion and a plurality of coupling legs rearwardly extending from the driving portion to connect to the driven rotor, the driven rotor further has a plurality of connecting slots formed on a base surface, wherein the coupling legs are to be inserted into the connecting slots respectively so as to connect the actuation member to the driven rotor.

4. The spotlight unit, as recited in claim 3, wherein the illuminating module further comprises a main control board, wherein the illuminating units are mounted on the main control board, the illuminating units are arranged in an array to form at least one illuminating zone positioned corresponding to that of the lens element.

5. The spotlight unit, as recited in claim 4, wherein the adjustable lens module comprises a peripheral frame for supporting the lens element thereon, the lens element is configured from transparent material, and has a plurality of annular convex portions and a plurality of annular concave portions concentrically arranged with respect to each.

6. The spotlight unit, as recited in claim 3, wherein the adjustable lens module comprises a peripheral frame for supporting the lens element thereon, the lens element is configured from transparent material, and has a plurality of annular convex portions and a plurality of annular concave portions concentrically arranged with respect to each.

* * * * *